Patented May 15, 1951

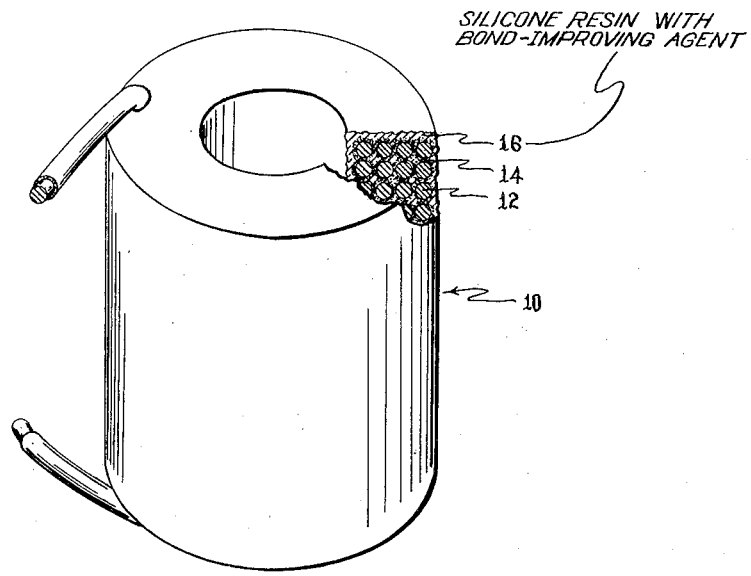

2,553,362

UNITED STATES PATENT OFFICE 2,553,362

ELECTRICAL INSULATION

Eli M. Dannenberg, Brookline, Mass., assignor to Sprague Electric Company, North Adams, Mass., a corporation of Massachusetts Application May 28, 1946, Serial No. 672,918

7 Claims. (Cl. 175—21)

This invention relates to improved electrical insulation and more particularly refers to insulation comprising the so-called "silicone" resins and novel modifications thereof.

The use of various resins as insulating enamels for wires, etc., as well as the impregnation of coils of wire and the like, has been carried out for years. In many cases, resins such as phenolic resins and natural resins, have been highly satisfactory for this purpose.

In recent years, there has been a decided trend toward the manufacture of electrical products which may be operated at high temperatures, e. g., 125° C. or greater, for improved electrical efficiency as well as for decreased volume requirements. Since temperatures over 125° C. are above the deterioration point of many types of insulation previously used, e. g., cotton, rubber and many of the resins, a number of improved insulating resins and varnishes have been developed. Representative of these recently developed products are "silicone resins" which are resinous organo-substituted polysiloxanes in which the organo groups are monovalent hydrocarbon radicals and in which any unsaturation is aromatic only. These varnishes have been used as impregnants for porous insulating coatings, since they may be polymerized to resins which improve substantially certain characteristics of the original coating. They may also be used as insulations per se.

The "silicones" possess a high degree of stability at temperatures of 200° C. and greater. Since solutions of very high polymers are extremely viscous, it has been customary to impregnate the coatings of coils and the like with low polymers, or solutions thereof, and subsequently complete the polymerization of the "silicone," and/or effect solvent removal, by heating the treated coil at temperatures in the range of about 175° C. to about 250° C. The coil so prepared, to all outward appearances, is a solid, durable unit. Unfortunately, however, it has been found that insulated copper conductors, which are conventionally employed in magnets, motor windings, transformers and the like, have undergone an unexpected and undesirable change during the impregnating and curing processes. It has been observed that the impregnated resin coating no longer adheres to the conductor surface. Further, it has been found that the resin itself has become dark and is more brittle. Coils of this type have greatly reduced value, and frequently must be discarded.

It is an object of the present invention to overcome the foregoing and related disadvantages. A further object is to produce improved high temperature insulated conductors in which there is no reaction between insulation and conductors. A further object is to produce resin impregnated coils in which no deterioration is present. A still further object is to produce improved silicone insulating compositions containing a copper-silicone reaction inhibitor. Additional objects will become apparent from the following description and claims.

These objects are attained in accordance with the present invention which pertains to an insulating material comprising a resin which produces compounds possessing reducing characteristics during curing and to which has been added an inhibitor which prevents reaction of these compounds with metals and/or metal oxides. In a more restricted sense, the invention is concerned with an insulating material comprising a curable silicone resin which produces during curing reducing compounds possessing a carbonyl group and to which has been added an inhibitor which prevents reaction of these compounds with copper conductors. In a still more restricted sense, the invention is concerned with an insulating material comprising a silicone resin which produces during curing compounds possessing an aldehyde or ketone group to which has been added an inhibitor selected from the class containing derivatives such as the hydroxylamines, phenyl hydrazines and semicarbazides. In its preferred embodiment, the invention is concerned with an impregnating material comprising a silicone resin to which has been added a small amount of an inhibitor selected from the class containing nitro-substituted phenylhydrazines. The invention is further concerned with wires, coils and other products employing the insulation material of the invention as well as with methods of producing them.

According to the broad embodiments of my invention, I have found that heretofore unattainable high temperature insulation may be produced by adding to the insulating resin an inhibitor which will prevent interaction of undesirable polymerization and/or condensation by-products of the resin with metal conductors and metal oxides. I have discovered that the effect of these by-products is extremely detrimental, although I am not fully aware of their action. It appears that undesirable reducing materials are given off in certain resin curing operations. I have also observed that reducing materials caused marked deterioration of the resin and definite loss of adhesion between the resin and the conductors insulated by the former. I have found that inhibitors selected from the class containing oxidizing agents particularly those of an aromatic type, are surprisingly effective in preventing reaction of these by-products with copper and other conductors, thereby eliminating the undesirable results customarily resulting therefrom.

More particularly, I have found that insulating resins of the class which produce aldehydes during curing may be vastly improved by addition thereto of a nitrogen-containing inhibitor. For example, nitro compounds, generally, such as hydroxyl amines, aryl hydrazines, semi-carbazides and nitro-substituted aryl compounds are useful as inhibitors. There are numerous resins which produce compounds having carbonyl groups in the course of the curing operation, or during subsequent use. Among these are included the "silicone" resins which can be defined as resinous organo-substituted polysiloxanes in which the organic groups are monovalent hydrocarbon radicals and in which any unsaturation is aromatic only. Typical commercial resins of this group appear to give off formaldehyde as well as other by-products during the curing operation. The examples given in later paragraphs will clarify the undesirable effect of this formaldehyde.

While I do not care to be restricted to any theory, it is my belief that the carbonyl compounds, such as formaldehyde, reduce the oxide film on the surface of the conductor, leaving either a lower oxide or the metal per se. The thin oxide film normally present on insulated conductors, particularly copper, appears to be essential for the adherence of the insulation to the conductor. Consequently, when this film is destroyed, the adhesion of the insulation disappears, with the failure or marked depreciation of the product. Thus if an insulated copper wire is wound into a coil form such as used in relays, motors, transformers, and the like, and the coil is impregnated with a resin which is to be cured in situ, the original insulation on the wire will no longer adhere to the conductor and the coil will be considerably more fragile and likely to fail upon vibration and other physical shocks. Also, the moisture resistance of the coil is considerably reduced over the value expected from the resin treatment.

According to one of the preferred embodiments of my invention, I produce improved "silicone" insulating resins by incorporating in them small amounts of an inhibitor such as an aromatic hydrazine, semicarbazide or hydroxylamine, in which the aromatic groups are preferably of the benzene series. Excellent results have been obtained by use of nitro- and dinitro-phenylhydrazines, particularly, p-nitrophenylhydrazine and 2,4-dinitrophenylhydrazine as inhibitors for copper-silicone resin reactions. Among the other aromatic hydrazines which may be employed with good results as inhibitors are:

Phenylhydrazine
Benzylhydrazine
p-Bromo-phenylhydrazine
1,1-diphenyl-hydrazine
1-ethyl, 1-phenylhydrazine
2,4-dichlorophenyl hydrazine
1-isoamyl, 1-phenylhydrazine
1-methyl, 1-phenylhydrazine
1-naphthyl hydrazine
o-Nitrophenylhydrazine
m-Nitrophenylhydrazine
Picrylhydrazine
o-Tolylhydrazine
m-Tolylhydrazine
p-Tolylhydrazine
2,3 xylyl hydrazine
2,5 xylyl hydrazine Among the semicarbazides which may be employed are:

1-phenyl semicarbazide
1-benzyl semicarbazide, etc.

Among the hydroxyl amines which may be employed are:

Benzyl hydroxylamine
Phenyl hydroxylamine
o-Tolyl hydroxylamine
m-Tolyl hydroxylamine
p-Tolyl hydroxylamine Obviously, many other compounds within this series may be used without departing from the invention. It is to be understood that mixtures of two or more of the foregoing or related compounds may be used in place of a single compound.

In addition, I have found that organic inhibitors containing the nitro group are also effective in preventing the deterioration otherwise produced by copper-silicone resin reaction. Among these are the aryl nitro compounds such as dinitrotoluene and 3-nitro-2-aminotoluene. It is further contemplated that high molecular weight alkyl nitro paraffins may be employed. I have also found that azobenzene compounds and aniline compounds are useful. A typical, suitable compound of this type is m-nitro-dimethyl aniline.

I also contemplate using peroxides which are stable to heat under the impregnating and curing conditions, but which are capable of preventing the silicone resin-copper reaction.

It will thus be apparent that a wide number of compounds are useful as inhibitors as herein defined. As a general rule, I prefer the inhibitors to have at least one of the following properties at the curing temperature of the resin. First, the inhibitor should be of the oxidizing type such as those having a nitro group in their structure. Second, the inhibitor should be capable of reacting with a carbonyl group (C=O group). Extremely desirable results may be obtained when the inhibitor falls within both of these classifications. Two examples of this are the p-nitrophenyl hydrazine and the 2,4-dinitrophenyl hydrazine.

The specific compound selected as an inhibitor in accordance with the invention, for most purposes, should be soluble in the resin or the resin solvent and should be relatively thermally stable at the temperature of the resin curing, even though it may exist as an absorbed gas in this temperature. In the case of a silicone resin, the aldehydes produced during the curing reaction are apparently given off in gaseous form and thus presumably dissolve, at least in part, in the partially cured resin or elsewhere. Presence of a suitable inhibitor, such as 2,4-dinitrophenylhydrazine, in the resin preserves the primary insulation and surface of the copper or other metallic conductor, as well as preventing any deterioration of the cured resin.

The amount of agent employed is generally between about .1% and about 5%, by weight of the resin impregnant or material, and preferably, is between .5% and 2%. The following examples will further clarify the invention. In each case, the silicone resin which was used to impregnate the coils was Silicone Resin 992, a product marketed by the Dow-Corning Corporation. This resin has been shown by analysis to be a phenyl ethyl polysiloxane having a phenyl : ethyl : silicone mol ratio of about 0.77 : 0.43 : 1.

EXAMPLE 1

A coil was prepared by space winding bare copper wire upon a suitable form, using porous glass cloth as a layer separator (interlayer insulation). The wound coil was heated to 120° C. and placed under a pressure of 5 mm. Hg. The silicone resin referred to above was introduced at 120° C. and allowed to impregnate and cover the coil for 15 minutes. At the end of this time, the vacuum was broken and atmospheric pressure maintained over the silicone resin and coil for 15 minutes more. The coil was then removed and allowed to drain for a few minutes and placed in an oven at 185° C., where it was left for 24 hours.

After curing and cooling, the coil was transversely cut and examined. The resin insulation did not adhere to the copper wire and could be removed therefrom with ease, leaving shiny, bare copper wire. The resin was dark in color. Comparative results are reported in the table.

EXAMPLE 2

The procedure of Example 1 was followed with the exception that the impregnated coils were cured for 24 hours at 240° C.

EXAMPLE 3

The procedure of Example 1 was followed with the exception that the impregnated coils were cured for 18 hours at 230° C.

EXAMPLE 4

The procedure of Example 2 was followed with the exception that 1% by weight of 2,4-dinitrophenyl hydrazine was dispersed and/or dissolved in the resin before impregnation.

EXAMPLE 5

The procedure of Example 2 was followed with the exception that 1% by weight of p-nitrophenyl hydrazine was dispersed and/or dissolved in the resin before impregnation.

EXAMPLE 6

The procedure of Example 1 was followed with the exception that 2% by weight of 2,4-dichlorophenyl hydrazine was dispersed and/or dissolved in the resin before impregnation.

EXAMPLE 7

The procedure of Example 1 was followed with the exception that 1% by weight of phenyl semi-carbazide was dispersed and/or dissolved in the resin before impregnation.

EXAMPLE 8

The procedure of Example 2 was followed with the exception that 2% by weight of phenyl semi-carbazide was dispersed and/or dissolved in the resin before impregnation.

EXAMPLE 9

The procedure of Example 1 was followed with the exception that 2% by weight of dinitrotoluene was dispersed and/or dissolved in the resin before impregnation.

EXAMPLE 10

The procedure of Example 1 was followed with the exception that 2% by weight of azobenzene was dispersed and/or dissolved in the resin before impregnation.

EXAMPLE 11

The procedure of Example 3 was followed with the exception that 1% by weight of 3-nitro-2-amino-toluene was dispersed and/or dissolved in the resin before impregnation.

EXAMPLE 12

The procedure of Example 3 was followed with the exception that 1% by weight of m-nitro-dimethyl aniline was dispersed and/or dissolved in the resin before impregnation.

The following table gives the results of examination of the coils produced in the above examples, after their curing:

*Table*

| Example | Inhibitor | Quantity | Remarks (adhesion of insulation to copper wire) |
|---|---|---|---|
| | | Per cent | |
| 1 | None | | No Adhesion. |
| 2 | do | | Do. |
| 3 | do | | Do. |
| 4 | 2,4-dinitrophenyl hydrazine | 1 | Perfect Adhesion. |
| 5 | p-nitrophenyl hydrazine | 1 | Do. |
| 6 | 2,4-dichlorophenyl hydrazine | 2 | Good Adhesion. |
| 7 | phenyl semi-carbazide | 1 | Do. |
| 8 | do | 2 | Do. |
| 9 | dinitrotoluene | 2 | Fairly Good Adhesion. |
| 10 | azo-benzene | 2 | Good Adhesion. |
| 11 | 3-nitro-2 amino toluene | 1 | Do. |
| 12 | m-nitro-dimethyl aniline | 1 | Do. |

Experiments have been conducted in which the resin impregnated coil was cured in a reducing atmosphere, specifically hydrogen. It was noted that the hydrogen atmosphere accelerates the non-adhesiveness of the resin to the copper conductor.

The invention is particularly directed to the treatment of resins which are to be contacted with copper conductors. However, many other conductors are likewise affected by the curing by-products of the resin and may be used in conjunction with the inhibitor containing impregnating resins of the invention with desirable results.

The types of insulated conductors (in coil form or otherwise) which may be treated with modified impregnating and coating resins of the invention are numerous. Among these are wires coated with organic enamels, cotton braid, glass fibres, ceramic insulation, etc. For high temperature operation, the ceramic insulated conductors are preferable, since the insulation does not exhibit thermoplastic flow at elevated temperatures. Conductors insulated in this manner are disclosed in U. S. Patent No. 2,213,969. Coils wound with ceramic insulated wires are disclosed in U. S. Patent No. 2,350,822 and may be advantageously impregnated in accordance with the invention.

According to a preferred embodiment of the invention, all types of insulated and uninsulated conductors may be treated with the inhibitors of the invention prior to winding of the coil. By this expedient it is unnecessary to add an inhibitor to the impregnating resin since the presence of the inhibitor on the insulated conductor will prevent any interaction between the conductor per se and the resin. This procedure also has the advantage of insuring a uniform distribution of inhibitor throughout the impregnated coil.

Typical of the procedures of this embodiment is the treatment of a ceramic coated copper wire with an inhibitor of the invention. A conductor coated in accordance with the instructions given in co-pending application, S. N. 536,448, filed on May 20, 1944, by Stanley O. Dorst, and now Patent No. 2,495,630, granted January 24, 1950, may be modified in accordance with this embodiment of the invention. Thus the procedure would involve first depositing a uniform coating of ceramic particles upon the copper conductor by electrophoretic means, then impregnating the pores of the coating with a decomposition product of aluminum nitrate, and subsequently applying a thin top coating of a silicone resin which is modified with a surface active agent such as a stearic acid. The inhibitor may be added to the solution of the resin and stearic acid or preferably may be applied in a subsequent individual coating from a suitable solvent, such as aniline or hot ethyl acetate. However, other means may be used if they will produce a uniform coating of a small amount of inhibitor such as 2,4-dinitrophenyl hydrazine on the surface of the conductor insulation. In many cases it is desirable to have the inhibitor in contact with the conductor itself, in which case it is incorporated in the first coating thereon or later impregnated so as to be in the vicinity of the conductor surface.

The figure of the drawing shows such a coil 10. The individual turns of wire 12 are surrounded by the ceramic coating 14 and the turns are embedded in a silicone resin mass 16.

As many apparently widely different embodiments of this invention may be made without departing from the spirit and scope hereof, it is to be understood that the invention is not limited to the specific embodiments hereof except as defined in the appended claims.

I claim:

1. As an insulating material for copper conductors, a mixture of a resinous organo-substituted polysiloxane in which the organo substitutions are monovalent hydrocarbon radicals and in which any unsaturation is aromatic only, and a minor proportion of a substance selected from the group consisting of aromatic hydroxylamines, aromatic hydrazines and aromatic semicarbazides.

2. An insulating material for copper conductors, comprising a mixture of a resinous organo substituted polysiloxane in which the organo substitutions are monovalent hydrocarbon radicals and in which any unsaturation is aromatic only, and from about 0.1% to about 5% by weight of the resin, of a substance selected from the group consisting of aromatic hydroxylamines, aromatic hydrazines and aromatic semicarbazides.

3. An insulating material for copper conductors, comprising a mixture of a resinous organosubstituted polysiloxane in which the organo substitutions are monovalent hydrocarbon radicals and in which any unsaturation is aromatic only, and from about 0.5% to about 2% by weight of the resin of a phenylhydrazine.

4. An insulating material for copper conductors, comprising a mixture of a resinous organo-substituted polysiloxane in which the organo substitutions are monovalent hydrocarbon radicals and in which any unsaturation is aromatic only, and from about 0.5% to about 2% by weight of the resin of 2,4-dinitrophenylhydrazine.

5. An insulating material for copper conductors, comprising a mixture of a resinous organo-substituted polysiloxane in which the organo substitutions are monovalent hydrocarbon radicals and in which any unsaturation is aromatic only, and from about 0.5% to about 2% by weight of the resin of p-nitrophenylhydrazine.

6. An electrical coil comprising a plurality of turns of copper wire the individual turns of which are bonded together and insulated from each other by porous ceramic impregnated with the in situ heat cured insulating material defined in claim 2.

7. A copper conductor having bonded to its surface a solid layer resulting from the heat-curing in situ of the insulating material defined in claim 2.

ELI M. DANNENBERG.

REFERENCES CITED

The following references are of record in the file of this patent:

UNITED STATES PATENTS

| Number | Name | Date |
| --- | --- | --- |
| 961,805 | Scott | June 21, 1910 |
| 1,741,778 | Jones | Dec. 31, 1929 |
| 1,906,044 | Burk | Apr. 25, 1933 |
| 2,001,071 | Sibley | May 14, 1935 |
| 2,147,824 | Webb | Feb. 21, 1939 |
| 2,215,996 | Benton | Sept. 24, 1940 |
| 2,258,219 | Rochow | Oct. 7, 1941 |
| 2,350,822 | Robinson | June 6, 1944 |
| 2,352,974 | Rochow | July 4, 1944 |
| 2,386,466 | Hyde | Oct. 9, 1945 |
| 2,389,802 | McGregor et al. | Nov. 27, 1945 |
| 2,389,805 | McGregor et al. | Nov. 27, 1945 |

OTHER REFERENCES

Rochow: Chemistry of the Silicones, Wiley, 1946, page 122.

Rochow: The Organosilicon Polymers, Chemical and Engineering News, vol. 23, No. 7, April 10, 1945, page 616.

Silicones, Scientific American, Jan. 1945, page 28.